United States Patent Office 3,035,968
Patented May 22, 1962

3,035,968
SILVER ION BACTERICIDAL COMPOSITION
Werner J. Degoli, Zurich, Switzerland, assignor to Sana-Silver Corporation, Buffalo, N.Y., a corporation of New York
No Drawing. Filed Aug. 29, 1960, Ser. No. 52,349
10 Claims. (Cl. 167—14)

This invention relates a composition of matter having desirable properties as a bactericide and disinfectant.

The present invention resides in the concept of combining specific proportions of free silver ions ($Ag^+$), water, and a composition selected from the group consisting of sodium sulfate or potassium sulfate. The physical embodiment of this concept has unique properties as a bactericide not logically predictable from the established bactericidal properties of related compositions.

Silver and silver salts have been in the past used as sterilizers for various media. Silver nitrate and silver phosphates have, for example, been used in sterilizing plastics, paper, textiles, etc. Colloidal silver compositions have been used in the prior art for treatment of water in swimming pools and the like.

Silver in ionic form has been known and used for the purification and sterilization of liquids. This ionic form of silver is supplied electrolytically and immediately upon formation these silver ions are contacted with the liquid to be treated. This method, although found to be useful in some respects, has certain disadvantages and limitations. Its widespread commercial use as such has been precluded by these limitations. First, its application and commercial use is entirely limited to the treatment of liquids. By the very nature of this process it is required to sterilize the substance to be treated in situ; the liquid to be treated is poured into a container where it is contacted by electrodes which supply the silver in ionic form. The liquid is then withdrawn from the container after treatment. It is apparent that this process is entirely without utility for the treatment of solids of any form.

A second disadvantage of this process is that although various adjusting and controlling devices are provided, the quantitative ionic silver invariably varies. It is indeed difficult, if not impossible, to regulate or limit the amount of silver acting upon the treated substance; thus, if a liquid will tolerate only a maximum amount of silver (such as liquid foods), only with the greatest control and effort is it possible to keep within the required dosage. Even this, however, is not sufficient to allow one using this system to obtain a constant degree of treatment in various runs on similar liquid solutions.

To warrant the use of any method or composition commercially, in addition to being useful as such, it should be among other things economical. The cost of the method or material must be commensurate with its specific use. A third disadvantage of the above discussed prior art is that it involves purchasing expensive equipment and apparatus to produce the ionic silver, it involves expensive upkeep and maintenance of this electrochemical system, and it involves expensive manpower to operate, regulate and manipulate the controls of this system.

A fourth and a primary disadvantage of this system is that the ionic silver solution produced is extremely unstable and loses its disinfecting properties very rapidly.

Because of the above enumerated limitations of the prior art ionic silver methods, these methods have not found widespread and successful commercial success or acceptance. It is apparent from the above that there is a demanding need in commerce for an ionic silver bactericide and disinfectant that:

(1) Has extremely desirable activity on not only liquids but also solids;

(2) Is easily and accurately controlled, is consistent in composition and requires no involved and objectionable regulatory procedures;

(3) Is competitive with other similar compositions in commercial use both as to activity and monetary considerations;

(4) Is of the highest stability and remains homogeneous over a long period of time.

The composition of this invention provides a product that has among others all the above four listed desirabilities. It was surprising to find that the desirable bactericidal and disinfecting effect of ionic silver can be utilized in a solution having a high stability. It has been found that if potassium sulfate or sodium sulfate is added to a solution comprising free silver ions, these sulfates impart a highly desirable stabilizing effect on the silver without interfering with or altering the bactericidal or disinfecting properties of the silver. Not only does the sodium or potassium sulfate have a stabilizing effect on the silver, but it has a two-fold carrier-buffer function on the solution with the bonus effect of not imparting any degree of toxicity to the solution. This property of non-toxicity is extremely important since (although extensive research is not complete as yet) the composition of this invention has definitely proven utility in the preservation, cleaning and prophylactic treatment of solid and liquid food stuffs. Other clear indications of utility for the composition of this invention have been for treatment of catarrhal infections of human stomach and intestines; as a coagulating agent; for treatment of infections of the mouth and skin; as a contraceptive and antiseptic solution for feminine hygiene; for use in manufacture of bactericidal ice; as an antiseptic; and as a fungicide. The composition of this invention alone or together with other compositions may be used in the manufacture of all types of filters; for example, industrial and cigarette filters. In the preferred embodiment of this invention 2.5 parts of potassium sulfate is combined with 1 part of free silver ions; to this mixture is added 996.5 parts of water. The preferred range ratio of combination of these components varies from about 0.5–4.0 parts of free silver ions to from about 2.0–5.0 parts of sodium or potassium sulfate. A composition comprising from 0.5–5.0 parts of free silver ions, from 1.0–15.0 parts of either potassium or sodium sulfate, dissolved in 1 liter of water is utilizable but does not exhibit the desirable properties of the preferred embodiment stated above. It is to be understood, however, that these amounts are merely shown by way of illustration and not of limitation. Variations of content may be made depending on the specific conditions existing as to required use. Also embodied within the spirit of this invention is the use of alkali metals other than potassium and sodium.

The composition of this invention may be prepared in the following manner:

To one part of free silver ions is added 2.5 parts of potassium sulfate and 332.2 parts of water. This solution is brought to a temperature of about 65° centigrade during a time of approximately ten minutes. The solution is then cooled to about 30°–40° centigrade. After full absorption of the free silver ions appears, another 332.2 parts of water is added. The solution is kept under constant agitation. After approximately 8–10 days of storage in a stantially dark storage vessel kept at a temperature of 15°– 35° centigrade, the solution is filtered to remove any undissolved or suspended impurities. Any source of sodium or potassium or free silver ions (for example by electrolytic process) may be used in obtaining starting materials.

The resulting composition is a highly stable aqueous silver ion-potassium or sodium sulfate solution free from odor, taste, and color, insensitive to light and one which will retain its activity for even years. It was found that a liter of water having dissolved therein the composition of this invention contained a silver ion concentration of 1.90 grams per liter of water. After standing for four months, the silver ion concentration was again determined; it was found that the solution had a concentration of 1.68 grams per liter of water. Prior art silver ion (produced electrolytically) completely dissociated after standing this same amount of time. The composition of this invention provides a bactericide and disinfectant which has no irritating or corrosive action even when the silver ion content is increased, it is of the highest stability with instant disinfecting and bactericidal effect. It not only controls the bacteria immediately upon application, but it has a substantial residual effect in controlling subsequent contamination of the substance to be treated. The amount of residual effect, of course, depends on the amount and concentration of composition used. The oligo-dynamic active doses of the composition of this invention are as follows:

60–150 gammas silver ion per liter of $H_2O$—feeble activity

150–200 gammas sliver ion per liter of $H_2O$—slightly active

200–500 gammas silver ion per liter of $H_2O$—fair activity

500–1,000 gammas silver ion per liter of $H_2O$ good activity 1,000 plus gammas silver ion per liter of $H_2O$— excellent activity In all the above solutions the required amount of alkali-metal stabilizer was added to the silver ions. The germicidal and bactericidal effect of the composition of this invention is especially directed against coli-bacteria; however, tests also showed good activity on *Esch. coli, Aerobakt. aerogenes, Bact. proteus, Staphylococcus aureus,* and *S. pullorum.* The mechanics and effect of this silver may be demonstrated by the germ precipitating, non-amalgamating effect, which allows an instant control of the degree of the cleaning and germicidal action which is directed on the surface and level of the bacteriological charge. The solution gets turbid as soon as there is a higher charge of bacteria. The bacteria is precipitated out of the solution. As there is no alteration of the treated material or food stuffs, the treatment may be repeated if needed.

Because of the constant stability of the composition of this invention, it may be shipped and stored for long periods of time; and at the time of use be as effective as when first formulated. This is a primary advantage of the composition of this invention over the electrochemical aqueous silver ion solutions heretofore used in the prior art. The prefixed content of silver ions also allows easy control and regulation of the desired concentration and strength. The strength of the solution used may be easily and conveniently made, and evaluation of the required dilution in any specific instance may be conveniently determined.

This invention may be further illustrated by reference to the following examples:

Example I

In this example a highly contaminated bacteria substance animal bowel was used to illustrate the bactericidal effect of the composition of this invention. Samples of bowels from the identical source were taken and compared. The raw bowel specimen was not cleaned in any manner other than a 5–10 minute washing in running water. The water treated bowel was soaked in water for approximately 4 hours; the treated bowel was soaked in the same water for 4 hours and subsequently immersed for approximately ½ hour in a solution made from the composition of this invention. The solution was formulated by taking 1 cc. of the solution of this invention (which was 1 gram of silver ions and 2.5 grams of sodium or potassium sulfate dissolved in 1 liter of water) dissolved in 1 liter of water. The total concentration of silver ions, therefore, was approximately 1,000 gammas (or .001 gram) in 1 liter of water. The experiments were performed under room temperatures (16°–18° C.) and at 4°–6° C. The figures in the last three columns represent the number of remaining bacteria in sample bowels.

At 16°–18° C.

| Time lapse after treatments | Raw bowel | $H_2O$ treated bowel | Bowel treated with composition of this invention |
| --- | --- | --- | --- |
| Start (0 hours) | 173,000 | 142,000 | 27,500. |
| 24 hours | 235,000 | 175,000 | 31,700. |
| 72 hours | visibly altered. | visibly altered and incipient. | normal (substantially less than 173,000). |

At 4°–6° C.

| Start (0 hours) | 193,000 | 175,000 | 29,900. |
| --- | --- | --- | --- |
| 24 hours | 213,000 | 171,000 | 30,500. |
| 48 hours | 285,000 | 193,000 | 34,600. |
| 72 hours | deterioration noticeable. | fermenting and odor. | normal during additional 72 hours period (substantially less than 193,000.) |

The tests conducted as illustrated above show that bacteria infested bowels treated with the composition of this invention were reduced in bacteria count at least 600%.

Example II

To illustrate further the extremely desirable utility of the composition of this invention as a bactericide the same formulation used in Example I was used in another series of tests shown below.

A bacteria infested media was observed with the below results.

| Time lapse after treatments | $H_2O$ treated media | Media treated with composition of this invention |
| --- | --- | --- |
| Start (0 hours) | 211,000 | 17,600. |
| 24 hours | 375,000 | 37,000. |
| 48 hours | visible alteration | 18,000 (after additional 3 hour treatment with composition of this invention). |

The numbers in the last two columns indicate the number of bacteria germs found after a washing in water (second column) and after a washing in the composition of this invention. It will be noted that even after 48 hours bacteria germs may be effectively controlled by treatment with the composition of this invention.

Example III

To show the disinfecting and sterilizing properties of the composition of the present invention the following tests were performed.

Bottles used to contain milk were washed thoroughly. Half the bottles were washed in distilled water, the other half were washed in an aqueous solution containing 1,000 gammas of silver ions and 2,500 gammas of potassium sulfate. After each washing the bottles were allowed to stand for 5 days and then were tested for fungi, cultures, etc. Those bottles washed in distilled water showed positive evidence of the presence of pathogens while sterility tests on those bottles treated with the composition of this invention formulated as above gave a negative reaction to the presence of pathogenic germs. Similar results were obtained using from 2–5 times the concentration of the above stated compositions.

It was interesting to note in the above test (Example III) that the bottles treated with the present composition showed a prolonged disinfecting and sterilizing effect. This was found to be due to the presence of minute portions (1.5 millionths) of silver ions remaining in each of the treated bottles. These traces of silver ions adhering to the glass were proven to be without any significance hygienically or toxicologically. Because of this prolonged effect, together with other desirable characteristics, the use of this composition in the pharmaceutical and cosmetic fields is extremely promising. It should be mentioned that "parts" in the above discussion refer to parts by weight.

It is anticipated that the composition of this invention may be combined with other substances to enhance, synergise, or supplement said substances. For example, the inventive composition disclosed herein may be combined with other bactericides, disinfectants, fungicides, sterilizers, vitamins, hormones, medicines, etc. It has also surprisingly been found that by adding hydrogen peroxide ($H_2O_2$) to the composition of this invention a composition results which has extremely high bactericidal and fungicidal properties. This resulting composition has high activity without the prior art disadvantages such as the high toxicity of the silver-copper solutions used as germicides. The following tests were conducted using 1,000–5,000 gammas of free silver ions, 2,500–4,000 gammas alkali metal sulfate, and a predetermined amount of hydrogen peroxide. The hydrogen peroxide varied depending on the desired effect. 0.01–0.03% (of complete solution) of 30% hydrogen peroxide was used.

The following results were recorded:

TEST ORGANISM: FLUORESCENCE

| Time of treatment | Composition used | Germ count per sq. cm. | Germ count for entire carrier |
|---|---|---|---|
| 0 | control—no composition used | 19.6 | 8,000 |
| ½ hour | composition of this invention—no $H_2O_2$ | about 0.01 | 4.0 |
| 1 hour | do | about 0.0025 | 2.5 |
| ½ hour | composition of this invention plus $H_2O_2$ | about 0.0020 | 1.0 |

TEST ORGANISM: *STREPTOCOCCI-LACTIS*

| Time of treatment | Composition used | Germ count per sq. cm. | Germ count for entire carrier |
|---|---|---|---|
| 0 | Control—no composition used | 91.6 | 36,000 |
| ½ hour | composition of this invention—no $H_2O_2$ | 10.4 | 4,200 |
| 1 hour | do | 4.0 | 1,700 |
| ½ hour | composition of this invention plus $H_2O_2$ | 0.015 | 6.0 |
| 1 hour | do | 0.02 | 10.5 |

We also found that on the addition of hexamethylentetramin to the composition of this invention the resulting composition has highly desirable properties especially for the treatment of canned foods and fish.

The examples of the compositions of this invention, and methods of preparing and utilizing them which have been described in the foregoing disclosure, have been given for purposes of illustration, not limitation. Many other combinations, modifications and ramifications will naturally suggest themselves to those skilled in the art, based on the disclosure of the present basic discovery. These are intended to be comprehended within the scope of this invention.

I claim:

1. A bactericidal composition of a stable water soluble aqueous solution comprising about from 0.5–5.0 parts of silver ions, about from 1.0–15.0 parts of a substance selected from the group consisting of potassium sulfate, sodium sulfate, and mixtures thereof, and about from 300–1,000 parts water.

2. A bactericidal composition of a stable water soluble aqueous solution consisting of about 1.0 part of silver ions, about 2.5 parts of potassium sulfate and about 1,000 parts of water.

3. The method of controlling bacteria growth which comprises contacting said bacteria with a bactericidal amount of a composition comprising about from 0.5–5.0 parts of free silver ions, about from 1.0–15.0 parts of a substance selected from the group consisting of potassium sulfate, sodium sulfate, and mixtures thereof, and about from 300–1,000 parts water.

4. The method of controlling bacteria growth which comprises contacting said bacteria with a bactericidal amount of a composition consisting of about 1.0 part of free silver ions, about 2.5 parts of potassium sulfate, and about 1,000 parts of water.

5. The method of disinfecting which comprises contacting an infected locus with an aqueous solution consisting of about from 0.5–5.0 parts of silver ions, and about from 1.0–15.0 parts of a substance selected from the group consisting of potassium sulfate, sodium sulfate, and mixtures thereof, and about from 300–1,000 parts water.

6. The method of sterilizing and deodorizing solid foods which comprises applying to said solid food to be treated an aqueous solution consisting of about from 0.5–5.0 parts of silver ions, and about from 1.0–15.0 parts of a substance selected from the group consisting of potassium sulfate, sodium sulfate, and mixtures thereof, and about from 300–1,000 parts water.

7. The process for the preparation of an ionic silver-potassium sulfate aqueous solution which comprises combining from 0.5–5.0 parts of free silver ions with from 2.0–5.0 parts of potassium sulfate, adding to this mixture about 300 parts water, heating the resulting solution to about 65° C. for about from 5–15 minutes, cooling said solution to about 30°–40° C., adding an additional 300 parts of water to said solution, maintaining said solution at about 30°–40° C. and then adding a further 300 parts of water.

8. The process for the preparation of a silver-ion-potassium sulfate aqueous solution which comprises in addition to the process steps of claim 7, storing said solution for about 5–10 days in darkness at a temperature of about 15°–35° C.

9. The method of treating animal bowel which comprises contacting said animal bowel with an aqueous composition of about from 0.5–5.0 parts of free silver ions, about 1.0–15.0 parts of a substance selected from the group consisting of potassium sulfate, sodium sulfate, and mixtures thereof, and about from 300–1,000 parts water.

10. The method of controlling fungi growth which includes contacting the locus to be treated with a composition comprising a fungicidally active amount of a composition comprising 0.5–5.0 parts of free silver ions, about 1.0–15.0 parts of a substance selected from the group consisting of potassium sulfate, sodium sulfate, and mixtures thereof, about from 300–1,000 parts water, together with a fungicidally active amount of hydrogen peroxide.

References Cited in the file of this patent

Milks' Veterinary Pharmacology, Materia Medica and Therapeutics, 6th ed., 1949, Alex Eger Inc., Chicago, Ill., pp. 525–527.